US009777199B2

United States Patent
Miyagawa et al.

(10) Patent No.: US 9,777,199 B2
(45) Date of Patent: Oct. 3, 2017

(54) AMINE CATALYST FOR CURING POLYISOCYANATE COMPOUND AND POLYISOCYANATE ADHESIVE COMPOSITION CONTAINING AMINE CATALYST FOR CURING POLYISOCYANATE COMPOUND

(71) Applicant: TOSOH CORPORATION, Shunan-shi, Yamaguchi (JP)

(72) Inventors: Yasumichi Miyagawa, Shunan (JP); Hiroyuki Kiso, Shunan (JP)

(73) Assignee: TOSOH CORPORATION, Shunan (JP)

( * ) Notice: Subject to any disclaimer, the term of this patent is extended or adjusted under 35 U.S.C. 154(b) by 0 days.

(21) Appl. No.: 14/416,914

(22) PCT Filed: Jul. 26, 2013

(86) PCT No.: PCT/JP2013/070354
§ 371 (c)(1),
(2) Date: Jan. 23, 2015

(87) PCT Pub. No.: WO2014/017641
PCT Pub. Date: Jan. 30, 2014

(65) Prior Publication Data
US 2015/0203727 A1 Jul. 23, 2015

(30) Foreign Application Priority Data

Jul. 26, 2012 (JP) .................................. 2012-165665

(51) Int. Cl.
C09J 175/02 (2006.01)
C08G 18/18 (2006.01)
C09J 175/04 (2006.01)

(52) U.S. Cl.
CPC ............ *C09J 175/02* (2013.01); *C08G 18/18* (2013.01); *C08G 18/1808* (2013.01); *C08G 18/1825* (2013.01); *C09J 175/04* (2013.01)

(58) Field of Classification Search
None
See application file for complete search history.

(56) References Cited

U.S. PATENT DOCUMENTS

| | | | | |
|---|---|---|---|---|
| 5,166,223 | A | * 11/1992 | Savoca | C08G 18/1875 521/103 |
| 6,590,007 | B2 | * 7/2003 | Herrmann | C08G 18/0876 521/128 |
| 2008/0234402 | A1 | * 9/2008 | Lehmann | B01J 31/0204 521/118 |

FOREIGN PATENT DOCUMENTS

| | | |
|---|---|---|
| JP | 58-52378 | 3/1983 |
| JP | 11-35918 | 2/1999 |
| JP | 2000-501128 | 2/2000 |
| JP | 2000-302833 | 10/2000 |
| JP | 2001-181363 | 7/2001 |
| JP | 2002-69417 | 3/2002 |
| JP | 2007-238667 | 9/2007 |
| JP | 2009-507095 | 2/2009 |
| JP | 2009-215386 | 9/2009 |

OTHER PUBLICATIONS

International Search Report for PCT/JP2013/070354, mailed Oct. 15, 2013.

* cited by examiner

*Primary Examiner* — Jeffrey Washville
(74) *Attorney, Agent, or Firm* — Nixon & Vanderhye P.C.

(57) ABSTRACT

To provide an amine catalyst for curing a polyisocyanate which can satisfy both initial moldability before a thermal compression step and high reactivity at the time of thermal compression molding, and an adhesive composition containing it.

A catalyst comprising an amine compound (1) represented by the formula (1) and an amine compound (2) represented by the formula (2) is used as an amine catalyst for curing a polyisocyanate compound.

$$R^1\!\!\diagdown\!\!\underset{R^2\diagup}{N}\!\!-\!\!R^3 \quad (1)$$

wherein each of $R^1$ and $R^2$ which are independent of each other, is a $C_{1-4}$ hydrocarbon group, and $R^3$ is a $C_{1-4}$ hydrocarbon group having a hydroxy group or an amino group;

$$R^4\!\!\diagdown\!\!\underset{R^5\diagup}{N}\!\!-\!\!(CH_2)_m\!\!-\!\!\underset{\diagup R^7}{N}\!\!\diagdown\!\!R^6 \quad (2)$$

wherein each of $R^4$ and $R^5$ which are independent of each other, is a $C_{1-4}$ hydrocarbon group, $R^6$ is a $C_{1-4}$ hydrocarbon group or a $C_{1-4}$ hydrocarbon group having a hydroxy group or an amino group, $R^7$ is a $C_{1-4}$ hydrocarbon group having a hydroxy group or an amino group, and m is an integer of from 2 to 6.

15 Claims, No Drawings

AMINE CATALYST FOR CURING POLYISOCYANATE COMPOUND AND POLYISOCYANATE ADHESIVE COMPOSITION CONTAINING AMINE CATALYST FOR CURING POLYISOCYANATE COMPOUND

This application is a national phase of International Application No. PCT/JP2013/070354, filed on Jul. 26, 2013, which designated the U.S. and claims priority to Japan patent application No. 2012-165665, filed on Jul. 26, 2012, the entire contents of each of which are hereby incorporated by reference

TECHNICAL FIELD

The present invention relates to an amine catalyst for curing a polyisocyanate compound, and a polyisocyanate adhesive composition containing the amine catalyst. More particularly, it relates to an amine catalyst for curing a polyisocyanate compound which employs an amine compound having a specific structure as a catalyst for curing a polyisocyanate compound, and which can satisfy both initial moldability before a thermal compression step and high reactivity at the time of thermal compression molding in production of a synthetic board or in production of a ceiling material for an automobile, and a polyisocyanate adhesive composition comprising the amine catalyst.

BACKGROUND ART

A synthetic board has been used for a building material to be used for a deck, a terrace, a fence, a handrail or a post of a building, a bench, etc., a core of a lining of a door or a core of a panel put on the floor of a luggage room, which is an interior part of a vehicle, etc. Such a synthetic board is made of a synthetic material obtained by mixing small chips of e.g. wood and an adhesive, followed by thermal compression molding, and for example, a wooden synthetic board such as an oriented strand board (OSB), a particle board or a medium density fiberboard (MDF), a synthetic board obtained by molding foam scraps, ground rubber, paper, cloth, rice hull or the like, a board obtained by molding plant fibers, and a synthetic board obtained by molding an inorganic lightweight aggregate have been known.

Further, a ceiling material for an automobile obtained by laminating a foamed polyurethane sheet, a glass chopped strand mat and a surface skin and the like, followed by thermo compression bonding has been known.

Heretofore, as a general purpose adhesive used for production of such a synthetic board or ceiling material for an automobile, a urea resin, a urea melamine resin or a phenol resin has been mainly used, however, from a synthetic board or a ceiling material for an automobile using such a general purpose adhesive, formaldehyde which is one of substances causing sick building syndrome is diffused, such being problematic.

To take measures against such a problem, use of an adhesive composition containing an organic polyisocyanate compound and a tertiary amine compound as a catalyst for curing the organic polyisocyanate compound has been attempted. In a case where an organic polyisocyanate adhesive is used, in general, the pot life of a mixture of the adhesive composition and small pieces of e.g. wood is relatively short, and accordingly workability at the time of production of a synthetic board tends to deteriorate. Although it is possible to prolong the pot life by reducing the catalyst amount, such tends to lower physical properties of the resulting synthetic board or lower the productivity due to an increase of the thermal compression time. Further, also with respect to a ceiling material for an automobile, when a laminate is produced by thermo compression bonding, the workability is deteriorated by a short pot life, or the thermo compression bonding time is increased by a prolonged pot life, thus leading to a decrease of the productivity.

In order to solve such problems, use of a catalyst (temperature sensitive catalyst) which has low catalytic activity at room temperature and exhibits catalytic activity at a specific temperature depending upon the molding temperature as a catalyst to be used for an organic polyisocyanate adhesive has been proposed (for example, Patent Documents 1 and 2).

Patent Document 1 discloses as such a temperature sensitive catalyst an organic acid salt catalyst of a cyclic amine compound, however, the catalyst is inferior in the solubility in a polyisocyanate compound as compared with an amine compound and is hardly uniformly dispersed in the adhesive composition, whereby no uniform reactivity is obtained in some cases. Further, Patent Document 2 discloses a catalyst comprising a complex of formic acid (and as the case requires, a $C_{2-20}$ aliphatic monocarboxylic acid) and an aliphatic tertiary amine, however, this catalyst has a problem of corrosion of an apparatus by formic acid, and its alternative has been desired.

PRIOR ART DOCUMENTS

Patent Documents
  Patent Document 1: JP-A-11-35918
  Patent Document 2: JP-A-2002-69417

DISCLOSURE OF INVENTION

Technical Problem

Under these circumstances, the object of the present invention is to provide an amine catalyst for curing a polyisocyanate compound, which can satisfy both initial moldability before a thermal compression step and high reactivity at the time of thermal compression molding in production of a synthetic board or in production of a ceiling material for an automobile, and a polyisocyanate adhesive composition containing it.

Solution to Problem

The present inventors have conducted extensive studies to achieve the above object and as a result, found the amine catalyst and the polyisocyanate adhesive composition containing it of the present invention, and accomplished the present invention.

That is, the present invention provides the following amine catalyst for curing a polyisocyanate compound and polyisocyanate adhesive composition containing the amine catalyst.

[1] An amine catalyst for curing a polyisocyanate compound, which comprises an amine compound (1) represented by the following formula (1):

wherein each of $R^1$ and $R^2$ which are independent of each other, is a $C_{1-4}$ hydrocarbon group, and $R^3$ is a $C_{1-4}$ hydrocarbon group having a hydroxy group or an amino group; and an amine compound (2) represented by the following formula (2):

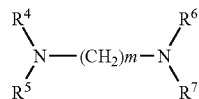

wherein each of $R^4$ and $R^5$ which are independent of each other, is a $C_{1-4}$ hydrocarbon group, $R^6$ is a $C_{1-4}$ hydrocarbon group or a $C_{1-4}$ hydrocarbon group having a hydroxy group or an amino group, $R^7$ is a $C_{1-4}$ hydrocarbon group having a hydroxy group or an amino group, and m is an integer within a range of from 2 to 6.

[2] The amine catalyst for curing a polyisocyanate compound according to the above [1], wherein the content ratio of the amine compound (1) to the amine compound (2) is within a range of from 10/90 to 90/10 by the weight ratio.

[3] The amine catalyst for curing a polyisocyanate compound according to the above [1] or [2], wherein in the amine compound (1), each of $R^1$ and $R^2$ which are independent of each other, is a methyl group, an ethyl group, a propyl group, a butyl group, an isopropyl group, an isobutyl group, a sec-butyl group or a tert-butyl group, and $R^3$ is a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group.

[4] The amine catalyst for curing a polyisocyanate compound according to any one of the above [1] to [3], wherein in the amine compound (2), each of $R^4$ and $R^5$ which are independent of each other, is a methyl group, an ethyl group, a propyl group, a butyl group, an isopropyl group, an isobutyl group, a sec-butyl group or a tert-butyl group, $R^6$ is a methyl group, an ethyl group, a propyl group, a butyl group, an isopropyl group, an isobutyl group, a sec-butyl group, a tert-butyl group, a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group, and $R^7$ is a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group.

[5] The amine catalyst for curing a polyisocyanate compound according to any one of the above [1] to [4], wherein the amine compound (1) is at least one compound selected from the group consisting of dimethyl-2-hydroxyethylamine, diethyl-2-hydroxyethylamine, dimethyl-3-hydroxypropylamine, diethyl-3-hydroxypropylamine, dimethyl-2-hydroxypropylamine, diethyl-2-hydroxypropylamine, dimethyl-4-hydroxybutylamine, dimethyl-2-aminoethylamine, diethyl-2-aminoethylamine, dimethyl-3-aminopropylamine, diethyl-3-aminopropylamine, dimethyl-2-aminopropylamine, diethyl-2-aminopropylamine and dimethyl-4-aminobutylamine.

[6] The amine catalyst for curing a polyisocyanate compound according to any one of the above [1] to [5], wherein the amine compound (2) is at least one compound selected from the group consisting of N,N,N'-trimethyl-2-hydroxyethylethylenediamine, N,N,N'-triethyl-2-hydroxyethylethylenediamine, N,N,N'-trimethyl-3-hydroxypropylethylenediamine, N,N,N'-trimethyl-2-hydroxypropylethylenediamine, N,N-diethyl-N'-methyl-2-hydroxyethylethylenediamine, N,N,N'-trimethyl-2-hydroxyethylpropylenediamine, N,N,N'-trimethyl-2-hydroxyethylbutylenediamine, N,N-dimethyl-N',N'-bis(2-hydroxyethyl)ethylenediamine, N,N-diethyl-N',N'-bis(2-hydroxyethyl)ethylenediamine, N,N-dimethyl-N',N'-bis(3-hydroxypropyl)ethylenediamine, N,N-dimethyl-N',N'-bis(2-hydroxypropyl)ethylenediamine, N,N-dimethyl-N',N'-bis(3-hydroxypropyl)propylenediamine, N,N-dimethyl-N',N'-bis(2-hydroxypropyl)propylenediamine, N,N-diethyl-N',N'-bis(2-hydroxypropyl)ethylenediamine, N,N-diethyl-N',N'-bis(2-hydroxypropyl)propylenediamine, N,N,N'-trimethyl-2-aminoethylethylenediamine, N,N,N'-triethyl-2-aminoethylethylenediamine, N,N,N'-trimethyl-3-aminopropylethylenediamine, N,N,N'-trimethyl-2-aminopropylethylenediamine, N,N-diethyl-N'-methyl-2-aminoethylethylenediamine, N,N,N'-trimethyl-2-aminoethylpropylenediamine, N,N,N'-trimethyl-2-aminoethylbutylenediamine, N,N-dimethyl-N',N'-bis(2-aminoethyl)ethylenediamine and N,N-diethyl-N',N'-bis(2-aminoethyl)ethylenediamine.

[7] A polyisocyanate adhesive composition comprising the amine catalyst for curing a polyisocyanate compound as defined in any one of the above [1] to [6], and an organic polyisocyanate compound.

[8] The polyisocyanate adhesive composition according to the above [7], which contains the amine catalyst for curing a polyisocyanate compound as defined in any one of the above [1] to [6] in an amount within a range of from 0.1 to 10 parts by weight per 100 parts by weight of the total amount of the organic polyisocyanate compound.

[9] A polyisocyanate adhesive composition comprising the amine catalyst for curing a polyisocyanate compound as defined in any one of the above [1] to [6], an organic polyisocyanate compound and an active hydrogen group-containing compound.

[10] The polyisocyanate adhesive composition according to the above [9], which contains the amine catalyst for curing a polyisocyanate compound as defined in any one of the above [1] to [6] in an amount within a range of from 0.1 to 10 parts by weight per 100 parts by weight of the total amount of the organic polyisocyanate compound and the active hydrogen group-containing compound.

[11] The polyisocyanate adhesive composition according to the above [9] or [10], wherein the active hydrogen group-containing compound is water.

[12] The polyisocyanate adhesive composition according to the above [11], wherein the content ratio (organic polyisocyanate compound/water) of the organic polyisocyanate compound to water is within a range of from 30/70 to 90/10 by the weight ratio.

Advantageous Effects of Invention

The amine catalyst for curing a polyisocyanate compound and the polyisocyanate adhesive composition containing it of the present invention have excellent effects such that both initial moldability before a thermal compression step and high reactivity at the time of thermal compression molding in production of a synthetic board or in production of a ceiling material for an automobile can be satisfied, and they are advantageous in view of the energy and improve the productivity, and accordingly they are advantageous in the cost reduction of a synthetic board and a ceiling material for an automobile and industrially very useful.

DESCRIPTION OF EMBODIMENTS

Now, the present invention will be described in further detail.

In the present invention, the amine catalyst for curing a polyisocyanate compound is characterized by comprising an amine compound (1) represented by the above formula (1) and an amine compound (2) represented by the above formula (2).

In the above formula (1), each of $R^1$ and $R^2$ which are independent of each other, is a $C_{1-4}$ hydrocarbon group, its structure is not particularly limited, and it may, for example, be a methyl group, an ethyl group, a n-propyl group, an isopropyl group, a n-butyl group, an isobutyl group, a sec-butyl group or a tert-butyl group.

Further, in the above formula (1), $R^3$ is a $C_{1-4}$ hydrocarbon group having a hydroxy group or an amino group, its structure is not particularly limited, and it may, for example, be a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group. Among them, $R^3$ is preferably a 2-hydroxyethyl group, a 3-hydroxypropyl group, a 2-hydroxypropyl group, a 2-aminoethyl group, a 3-aminopropyl group or a 2-aminopropyl group.

In the above formula (2), each of $R^4$ and $R^5$ which are independent of each other, is a $C_{1-4}$ hydrocarbon group, its structure is not particularly limited, and it may, for example, be a methyl group, an ethyl group, a n-propyl group, an isopropyl group, a n-butyl group, an isobutyl group, a sec-butyl group or a tert-butyl group.

In the above formula (2), $R^6$ is a $C_{1-4}$ hydrocarbon group or a $C_{1-4}$ hydrocarbon group having a hydroxy group or an amino group, its structure is not particularly limited, and it may, for example, be a methyl group, an ethyl group, a n-propyl group, an isopropyl group, a n-butyl group, an isobutyl group, a sec-butyl group, a tert-butyl group, a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group.

In the above formula (2), $R^7$ is a $C_{1-4}$ hydrocarbon group having a hydroxy group or an amino group, its structure is not particularly limited, and it may, for example, be a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group. Among them, $R^7$ is preferably a 2-hydroxyethyl group, a 3-hydroxypropyl group, a 2-hydroxypropyl group, a 2-aminoethyl group, a 3-aminopropyl group or a 2-aminopropyl group.

The above amine compound (1) may, for example, be specifically preferably dimethyl-2-hydroxyethylamine, diethyl-2-hydroxyethylamine, dimethyl-3-hydroxypropylamine, diethyl-3-hydroxypropylamine, dimethyl-2-hydroxypropylamine, diethyl-2-hydroxypropylamine, dimethyl-4-hydroxybutylamine, dimethyl-2-aminoethylamine, diethyl-2-aminoethylamine, dimethyl-3-aminopropylamine, diethyl-3-aminopropylamine, dimethyl-2-aminopropylamine, diethyl-2-aminopropylamine or dimethyl-4-aminobutylamine.

The above amine compound (2) may, for example, be specifically preferably N,N,N'-trimethyl-2-hydroxyethylethylenediamine, N,N,N'-triethyl-2-hydroxyethylethylenediamine, N,N,N'-trimethyl-3-hydroxypropylethylenediamine, N,N,N'-trimethyl-2-hydroxypropylethylenediamine, N,N-diethyl-N'-methyl-2-hydroxyethylethylenediamine, N,N,N'-trimethyl-2-hydroxyethylpropylenediamine, N,N,N'-trimethyl-2-hydroxyethylbutylenediamine, N,N-dimethyl-N',N'-bis(2-hydroxyethyl)ethylenediamine, N,N-diethyl-N',N'-bis(2-hydroxyethyl)ethylenediamine, N,N-dimethyl-N',N'-bis(3-hydroxypropyl)ethylenediamine, N,N-dimethyl-N',N'-bis(2-hydroxypropyl)ethylenediamine, N,N-dimethyl-N',N'-bis(3-hydroxypropyl)propylenediamine, N,N-dimethyl-N',N'-bis(2-hydroxypropyl)propylenediamine, N,N-diethyl-N',N'-bis(2-hydroxypropyl)ethylenediamine, N,N-diethyl-N',N'-bis(2-hydroxypropyl)propylenediamine, N,N,N'-trimethyl-2-aminoethylethylenediamine, N,N,N'-triethyl-2-aminoethylethylenediamine, N,N,N'-trimethyl-3-aminopropylethylenediamine, N,N,N'-trimethyl-2-aminopropylethylenediamine, N,N-diethyl-N'-methyl-2-aminoethylethylenediamine, N,N,N'-trimethyl-2-aminoethylpropylenediamine, N,N,N'-trimethyl-2-aminoethylbutylenediamine, N,N-dimethyl-N',N'-bis(2-aminoethyl)ethylenediamine or N,N-diethyl-N',N'-bis(2-aminoethyl)ethylenediamine.

In the amine catalyst for curing a polyisocyanate compound of the present invention, the content ratio of the amine compound (1) to the amine compound (2) is within a range of from 10/90 to 90/10 by the weight ratio, and if it is out of such a mixing ratio, it may be difficult to satisfy both initial moldability before a thermal compression step and high reactivity at the time of thermal compression molding in production of a synthetic board or in production of a ceiling material for an automobile. It is preferably within a range of from 30/70 to 70/30, particularly preferably within a range of from 40/60 to 60/40.

The amine catalyst for curing a polyisocyanate compound of the present invention contains the above amine compound (1) and the above amine compound (2), and may further contain another catalyst within a range not to depart from the scope of the present invention. Such a catalyst may, for example, be a conventional tertiary amine.

The tertiary amine is not particularly limited and may, for example, be a tertiary amine compound such as N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5,4,0]undecene-7, N-methylmorpholine, N-ethylmorpholine, bis(2-dimethylaminoethyl) ether, 1-methylimidazole, 1,2-dimethylimidazole, 1-isobutyl-2-methylimidazole, 1-dimethylaminopropylimidazole, N,N-dimethylethanolamine or N,N-dimethylpropanolamine.

The amine catalyst for curing a polyisocyanate compound of the present invention is a mixture of the above amine compound (1) and the above amine compound (2) and may contain another catalyst within a range not to depart from the scope of the present invention as mentioned above. To prepare the mixture, as the case requires, a solvent such as dipropylene glycol, ethylene glycol, 1,4-butanediol or water may be used. Further, the amine compound (1) and the amine compound (2) may be prepared as mixed or may be prepared separately. The amount of the above solvent is not particularly limited, and the concentration is optional.

The polyisocyanate adhesive composition of the present invention contains the amine catalyst for curing a polyisocyanate compound of the present invention and an organic polyisocyanate compound.

In the polyisocyanate adhesive composition of the present invention, the organic polyisocyanate compound is not particularly limited and may, for example, be an aromatic polyisocyanate such as toluene diisocyanate (TDI), diphenylmethane diisocyanate (MDI), naphthylene diisocyanate or xylylene diisocyanate, an alicyclic polyisocyanate such as cyclohexyl diisocyanate or isophorone diisocyanate, an aliphatic polyisocyanate such as hexamethylene diisocyanate, a free isocyanate-containing prepolymer obtained by reaction of such a polyisocyanate with a polyol, a modified polyisocyanate such as carbodiimide-modified isocyanate, or a mixture thereof.

TDI and its derivative may, for example, be a mixture of 2,4-TDI and 2,6-TDI or a terminal isocyanate prepolymer derivative of TDI.

MDI and its derivative may, for example, be both or either one of a mixture of MDI and its polymer polyphenyl polymethylene diisocyanate, and a diphenylmethane diisocyanate derivative having a terminal isocyanate group.

Specifically, Woodcure 300 (manufactured by NIPPON POLYURETHANE INDUSTRY CO., LTD.) which is a diphenylmethane iisocyanate derivative having a terminal isocyanate group may, for example, be mentioned.

The polyisocyanate adhesive composition of the present invention may contain an active hydrogen group-containing compound. In the present invention, the active hydrogen group-containing compound means a compound having an active hydrogen-containing functional group such as a hydroxy group or an amino group and may, for example, be a polyol or water.

The polyol may, for example, be a known polyether polyol, polyester polyol or polymer polyol, or a flame retardant polyol such as a phosphorus-containing polyol or a halogen-containing polyol or a phenol-based polyol such as a Mannich-based polyol. Such an active hydrogen group-containing compound may be used alone or optionally in combination.

The polyether polyol may, for example, be one produced by an addition reaction of an alkylene oxide (such as ethylene oxide or propylene oxide) to a compound having at least two active hydrogen groups as a starting material, for example, in accordance with a method disclosed in Gunter Oertel, "Polyurethane Handbook" (1985), Hanser Publishers (Germany), p. 42-53. Further, the compound having at least two active hydrogen groups may, for example, be a polyhydric alcohol such as ethylene glycol, propylene glycol, glycerin, trimethylolpropane or pentaerythritol, an aliphatic amine such as ethylenediamine, an aromatic amine such as toluenediamine, an alkanolamine such as ethanolamine or diethanolamine, sorbitol or sucrose.

The polyester polyol may, for example, be one obtained by reaction of a dibasic acid and glycol, a polyester polyol obtained from DMT residue or phthalic anhydride as a starting material, or a polyester polyol derived from waste at the time of production of nylon, TMP, waste of pentaerythritol, or waste or wastage of phthalic acid polyester, by treatment (Keiji Iwata, "Polyurethane Resin Handbook" (first edition in 1987), NIKKAN KOGYO SHIMBUN, LTD., p. 116-117).

The polymer polyol may, for example, be a polymerized polyol obtained by reaction of the above polyether polyol and an ethylenic unsaturated monomer (such as butadiene, acrylonitrile or styrene) in the presence of a radical polymerization catalyst.

The flame retardant polyol may, for example, be a phosphorus-containing polyol obtained by adding an alkylene oxide to a phosphoric acid compound, a halogen-containing polyol obtained by subjecting epichlorohydrin or trichlorobutylene oxide to ring-opening polymerization, or a phenol polyol such as a Mannich-based polyol.

From the viewpoint of the curing reactivity and the adhesive strength of the polyisocyanate adhesive composition, water is preferred as the active hydrogen group-containing compound.

In the polyisocyanate adhesive composition of the present invention, the content of the amine catalyst for curing a polyisocyanate compound of the present invention is usually from 0.1 to 10 parts by weight, preferably from 0.1 to 8 parts by weight, more preferably from 0.3 to 8 parts by weight per 100 parts by weight of the total amount of the organic polyisocyanate compound used. If it is smaller than 0.1 part by weight, curing tends to be insufficient, and physical properties of the resulting synthetic board or ceiling material for an automobile will deteriorate. If it exceeds 10 parts by weight, the initial moldability may deteriorate in some cases due to pre-curing before a thermal compression step.

Further, in a case where the polyisocyanate adhesive composition of the present invention contains an active hydrogen-containing compound, the content of the amine catalyst for curing a polyisocyanate compound of the present invention is within the above range per 100 parts by weight of the total amount of the organic polyisocyanate compound and the active hydrogen group-containing compound.

The weight ratio of the organic polyisocyanate compound to the active hydrogen group-containing compound in the polyisocyanate adhesive composition is not particularly limited, however, in a case where water is used as the active hydrogen group-containing compound, it is preferably within a range of from 30:70 to 90:10 from the viewpoint of the curing reactivity and the adhesive strength.

EXAMPLES

Now, the present invention will be described in further detail with reference to Examples and Comparative Examples. However, it should be understood that the present invention is by no means restricted to such specific Examples.

In the following Examples and Comparative Examples, methods for evaluating the curing reactivity are as follows.

[Curing Reactivity of Room Temperature (23° C.) Reaction]

200 g of a mixture in a blend ratio as identified in Table 1 or 2 is put in a 500 ml polypropylene cup and adjusted to a liquid temperature of 20° C. Using LAB Mixer, the mixture was continuously stirred at 500 rpm, and a time until the viscosity of the mixture was increased and surface of the mixture became flattened was measured.

[Curing Reactivity of 80° C. Reaction]

50 g of a mixture in a blend ratio as identified in Table 1 or 2 was put in a 500 ml polypropylene cup and adjusted to a liquid temperature of 20° C. The mixture was stirred by LAB Mixer at 2,000 rpm for 30 seconds. This mixture was continuously stirred using a stirring rod in a water bath at 80° C., and the time until the mixture started being solidified was measured.

Examples 1 to 9 and Comparative Examples 1 to 12

A mixture in a material blend ratio as identified in Table 1 was stirred at a liquid temperature of 20° C. using LAB mixer at 6,000 rpm for 5 seconds, to evaluate curing reactivities at room temperature and at 80° C. The results are shown in Tables 1 and 2.

TABLE 1

|  |  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| [Composition] |  |  |  |  |  |  |  |  |  |  |
| Isocyanate [1] | (pbw) | 100 | 100 | 100 | 100 | 100 | 100 | 100 | 100 | 100 |
| Water | (pbw) | 150 | 150 | 150 | 150 | 150 | 150 | 150 | 150 | 150 |
| Catalyst |  |  |  |  |  |  |  |  |  |  |
| Catalyst A [2] | (pbw) | 0.25 |  |  |  |  |  |  |  |  |
| Catalyst B [3] | (pbw) |  | 0.25 | 0.38 | 0.42 | 0.29 | 0.25 | 0.21 | 0.17 | 0.13 |
| Catalyst C [4] | (pbw) | 0.25 | 0.25 | 0.13 |  | 0.15 | 0.20 | 0.25 | 0.30 | 0.35 |
| Catalyst D [5] | (pbw) |  |  |  | 0.08 | 0.06 | 0.05 | 0.04 | 0.03 | 0.02 |
| [Results of evaluation of curing reactivity] |  |  |  |  |  |  |  |  |  |  |
| <Room temperature reaction> |  |  |  |  |  |  |  |  |  |  |
| Time until the mixture started curing | (min) | 62 | 90 | 117 | 125 | 102 | 95 | 84 | 69 | 60 |
| <80° C. reaction> |  |  |  |  |  |  |  |  |  |  |
| Time until the mixture started curing | (sec) | 179 | 175 | 195 | 160 | 206 | 187 | 167 | 136 | 120 |

[1] Woodcure 300 manufactured by NIPPON POLYURETHANE INDUSTRY CO., LTD.
[2] N,N-dimethylethanolamine
[3] Dimethyl-3-aminopropylamine
[4] N,N,N'-trimethyl-N'-(2-hydroxyethyl)ethylenediamine
[5] N,N-dimethyl-N',N'-di(2-hydroxypropyl)propylenediamine

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
| --- | --- | --- | --- | --- | --- | --- | --- | --- | --- | --- | --- | --- |
| [Composition] |  |  |  |  |  |  |  |  |  |  |  |  |
| Isocyanate [1] | (pbw) | 100 | 100 | 100 | 100 | 100 | 100 | 100 | 100 | 100 | 100 | 100 |
| Water | (pbw) | 150 | 150 | 150 | 150 | 150 | 150 | 150 | 150 | 150 | 150 | 150 |
| Catalyst |  |  |  |  |  |  |  |  |  |  |  |  |
| Catalyst A [2] | (pbw) | 0.50 |  |  |  |  |  |  |  |  |  |  |
| Catalyst B [3] | (pbw) |  | 0.50 |  |  |  |  |  |  |  |  |  |
| Catalyst C [4] | (pbw) |  |  | 0.50 |  |  |  |  |  |  |  |  |
| Catalyst D [5] | (pbw) |  |  |  | 0.50 |  |  |  |  |  |  |  |
| Catalyst E [6] | (pbw) |  |  |  |  | 0.50 |  |  |  |  |  |  |
| Catalyst F [7] | (pbw) |  |  |  |  |  | 0.50 |  |  |  |  |  |
| Catalyst G [8] | (pbw) |  |  |  |  |  |  | 0.50 |  |  |  |  |
| Catalyst H [9] | (pbw) |  |  |  |  |  |  |  | 0.50 |  |  |  |
| Catalyst I [10] | (pbw) |  |  |  |  |  |  |  |  | 0.50 |  |  |
| Catalyst J [11] | (pbw) |  |  |  |  |  |  |  |  |  | 0.50 |  |
| Catalyst K [12] | (pbw) |  |  |  |  |  |  |  |  |  |  | 0.50 |

TABLE 2-continued

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| [Results of evaluation of curing reactivity] <Room temperature reaction> | | | | | | | | | | | |
| Time until the mixture started curing (min) | 84 | 145 | 34 | 58 | 39 | 59 | 44 | 82 | 118 | >180 | >180 |
| <80° C. reaction> | | | | | | | | | | | |
| Time until the mixture started curing (sec) | 370 | >600 | 278 | 324 | 291 | 305 | 233 | 327 | 534 | >600 | 382 |

[1]) Woodcure 300 manufactured by NIPPON POLYURETHANE INDUSTRY CO., LTD.
[2]) N,N-dimethylethanolamine
[3]) Dimethyl-3-aminopropylamine
[4]) N,N,N'-trimethyl-N'-(2-hydroxyethyl)ethylenediamine
[5]) N,N-dimethyl-N',N'-di(2-hydroxypropyl)propylenediamine
[6]) Dimethyl-2-(2'-hydroxyethoxy)ethylamine
[7]) N,N,N',N"-N"-(2-hydroxypropyl)diethyltriamine
[8]) Dimethyl-6-hydroxyhexylamine
[9]) Bis(2-dimethylaminoethyl) ether
[10]) N,N,N',N'-tetramethylhexamethylenediamine
[11]) Triethylenediamine
[12]) N-(2-dimethylaminoethyl)-N'-methylpiperazine As evident from Examples 1 to 9 in Table 1, the polyisocyanate adhesive composition containing the amine catalyst for curing a polyisocyanate compound of the present invention does not have excessive curing reactivity at room temperature conditions and is excellent in the curing reactivity at high temperature, and thus it is indicated that both initial moldability before a thermal compression step and high reactivity at the time of thermal compression molding in production of a synthetic board or a ceiling material for an automobile can be satisfied.

Whereas, in Comparative Examples 1 to 12 in Table 2, the polyisocyanate adhesive composition is inferior in the curing reactivity at 80° C. Thus, at the time of thermal compression molding in production of a synthetic board or a ceiling material for an automobile, thermal compression for a long time is required, or the time until curing tends to be long, whereby an obtainable product may be inferior in mechanical properties.

INDUSTRIAL APPLICABILITY

The amine catalyst and the polyisocyanate adhesive composition containing it of the present invention are applicable to production of a synthetic board and a ceiling material for an automobile.

The entire disclosure of Japanese Patent Application No. 2012-165665 filed on Jul. 26, 2012 including specification, claims and summary is incorporated herein by reference in its entirety.

The invention claimed is:

1. An amine catalyst for curing a polyisocyanate compound, which consists of
an amine compound (1) represented by the following formula (1):

(1)

wherein each of $R^1$ and $R^2$ which are independent of each other, is a $C_{1-4}$ hydrocarbon group, and $R^3$ is a C1-4 hydrocarbon group having an amino group; and an amine compound (2) represented by the following formula (2):

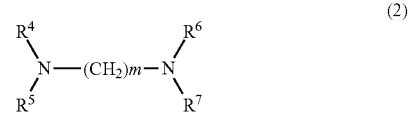

(2)

wherein each of $R^4$ and $R^5$ which are independent of each other, is a C1-4 hydrocarbon group, $R^6$ is a $C_{1-4}$ hydrocarbon group or a $C_{1-4}$ hydrocarbon group having a hydroxy group, $R^7$ is a $C_{1-4}$ hydrocarbon group having a hydroxy group, and m is an integer within a range of from 2 to 6, and
wherein the content ratio of the amine compound (1) to the amine compound (2) is within a range of from 40/60 to 90/10 by the weight ratio.

2. The amine catalyst for curing a polyisocyanate compound according to claim 1, wherein in the amine compound (1), each of $R^1$ and $R^2$ which are independent of each other, is a methyl group, an ethyl group, a propyl group, a butyl group, an isopropyl group, an isobutyl group, a sec-butyl group or a tert-butyl group, and $R^3$ is an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group.

3. The amine catalyst for curing a polyisocyanate compound according to claim 1, wherein in the amine compound (2), each of $R^4$ and $R^5$ which are independent of each other, is a methyl group, an ethyl group, a propyl group, a butyl group, an isopropyl group, an isobutyl group, a sec-butyl group or a tert-butyl group, $R^6$ is a methyl group, an ethyl group, a propyl group, a butyl group, an isopropyl group, an isobutyl group, a sec-butyl group, a tert-butyl group, a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, and $R^7$ is a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, or a 1,1-dimethyl-2-hydroxyethyl group.

4. The amine catalyst for curing a polyisocyanate compound according to claim 1, wherein the amine compound (1) is at least one compound selected from the group consisting of dimethyl-2-aminoethylamine, diethyl-2-aminoethylamine, dimethyl-3-aminopropylamine, diethyl-3-aminopropylamine, dimethyl-2-aminopropylamine, diethyl-2-aminopropylamine and dimethyl-4-aminobutylamine.

5. The amine catalyst for curing a polyisocyanate compound according to claim 1, wherein the amine compound (2) is at least one compound selected from the group consisting of N,N,N'-trimethyl-2-hydroxyethylethylenediamine, N,N,N'-triethyl-2-hydroxyethylethylenediamine, N,N,N'-trimethyl-3-hydroxypropylethylenediamine, N,N,N'-trimethyl-2-hydroxypropylethylenediamine, N,N-diethyl-N'-methyl-2-hydroxyethylethylenediamine, N,N,N'-trimethyl-2-hydroxyethylpropylenediamine, N,N,N'-trimethyl-2-hydroxyethylbutylenediamine, N,N-dimethyl-N',N'-bis(2-hydroxyethyl)ethylenediamine, N,N-diethyl-N',N'-bis(2-hydroxyethyl)ethylenediamine, N,N-dimethyl-N',N'-bis(3-hydroxypropyl)ethylenediamine, N,N-dimethyl-N',N'-bis(2-hydroxypropyl)ethylenediamine, N,N-dimethyl-N',N'-bis(3-hydroxypropyl)propylenediamine, N,N-dimethyl-N',N'-bis(2-hydroxypropyl)propylenediamine, N,N-diethyl-N',N'-bis(2-hydroxypropyl)ethylenediamine, and N,N-diethyl-N',N'-bis(2- hydroxypropyl)propylenediamine.

6. A method for curing a polyisocyanate compound, the method comprising contacting an amine catalyst with the polyisocyante compound,
wherein the amine catalyst comprises:
an amine compound (1) represented by the following formula (1):

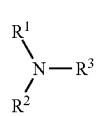
(1)

wherein each of $R^1$ and $R^2$ which are independent of each other, is a $C_{1-4}$ hydrocarbon group, and $R^3$ is a $C_{1-4}$ hydrocarbon group having an amino group; and
an amine compound (2) represented by the following formula (2):

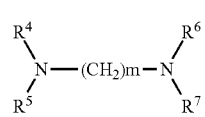
(2)

wherein each of $R^4$ and $R^5$ which are independent of each other, is a $C_{1-4}$ hydrocarbon group, $R^6$ is a $C_{1-4}$ hydrocarbon group or a $C_{1-4}$ hydrocarbon group having a hydroxy group, $R^7$ is a $C_{1-4}$ hydrocarbon group having a hydroxy group, and m is an integer within a range of from 2 to 6, and
wherein the content ratio of the amine compound (1) to the amine compound (2) is within a range of from 40/60 to 90/10 by the weight ratio.

7. The method according to claim 6, wherein in the amine compound (1), each of $R^1$ and $R^2$ which are independent of each other, is a methyl group, an ethyl group, a propyl group, a butyl group, an isopropyl group, an isobutyl group, a sec-butyl group or a tert-butyl group, and $R^3$ is an aminomethyl group, a 2-aminoethyl group, a 3-aminopropyl group, a 2-aminopropyl group, a 4-aminobutyl group, a 3-aminobutyl group, a 2-aminobutyl group, a 2-methyl-3-aminopropyl group, a 2-methyl-2-aminopropyl group or a 1,1-dimethyl-2-aminoethyl group.

8. The method according to claim 6, wherein in the amine compound (2), each of $R^4$ and $R^5$ which are independent of each other, is a methyl group, an ethyl group, a propyl group, a butyl group, an isopropyl group, an isobutyl group, a sec-butyl group or a tert-butyl group, $R^6$ is a methyl group, an ethyl group, a propyl group, a butyl group, an isopropyl group, an isobutyl group, a sec-butyl group, a tert-butyl group, a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, a 1,1-dimethyl-2-hydroxyethyl group, and $R^7$ is a hydroxymethyl group, a 2-hydroxyethyl group, a 3-hydroxypropyl group, a 2-hydroxypropyl group, a 4-hydroxybutyl group, a 3-hydroxybutyl group, a 2-hydroxybutyl group, a 2-methyl-3-hydroxypropyl group, a 2-methyl-2-hydroxypropyl group, or a 1,1-dimethyl-2-hydroxyethyl group.

9. The method according to claim 6, wherein the amine compound (1) is at least one compound selected from the group consisting of dimethyl-2-aminoethylamine, diethyl-2-aminoethylamine, dimethyl-3-aminopropylamine, diethyl-3-aminopropylamine, dimethyl-2-aminopropylamine, diethyl-2-aminopropylamine and dimethyl-4-aminobutylamine.

10. The method according to claim 6, wherein the amine compound (2) is at least one compound selected from the group consisting of N,N,N'-trimethyl-2-hydroxyethylethylenediamine, N,N,N'-triethyl-2-hydroxyethylethylenediamine, N,N,N'-trimethyl-3-hydroxypropylethylenediamine, N,N,N'-trimethyl-2-hydroxypropylethylenediamine, N,N-diethyl-N'-methyl-2-hydroxyethylethylenediamine, N,N,N'-trimethyl-2-hydroxyethylpropylenediamine, N,N,N'-trimethyl-2-hydroxyethylbutylenediamine, N,N-dimethyl-N',N'-bis(2-hydroxyethyl)ethylenediamine, N,N-diethyl-N',N'-bis(2-hydroxyethyl)ethylenediamine, N,N-dimethyl-N',N'-bis(3-hydroxypropyl)ethylenediamine, N,N-dimethyl-N',N'-bis(2-hydroxypropyl)ethylenediamine, N,N-dimethyl-N',N'-bis(3-hydroxypropyl)propylenediamine, N,N-dimethyl-N',N'-bis(2-hydroxypropyl)propylenediamine, N,N-diethyl-N',N'-bis(2-hydroxypropyl)ethylenediamine, and N,N-diethyl-N',N'-bis(2-hydroxypropyl)propylenediamine.

11. The method according to claim 6, wherein the step of contacting the amine catalyst with the polyisocyante compound occurs at a temperature of 20° C. to 80° C.

12. The method according to claim 6, wherein a content of the amine catalyst for curing a polyisocyanate compound is 0.1 to 10 parts by weight per 100 parts by weight of the polyisocyanate compound.

13. The method according to claim 6, wherein a content of the amine catalyst for curing a polyisocyanate compound is 0.1 to 8 parts by weight per 100 parts by weight of the polyisocyanate compound.

14. The method according to claim 6, wherein a content of the amine catalyst for curing a polyisocyanate compound is 0.3 to 8 parts by weight per 100 parts by weight of the polyisocyanate compound.

15. The method according to claim 6, wherein the polyisocyanate compound is one or more compounds selected from the group consisting of aromatic polyisocyanates, toluene diisocyanate, diphenylmethane diisocyanate, naphthylene diisocyanate, xylylene diisocyanate, alicyclic polyisocyanates, cyclohexyl diisocyanate, isophorone diisocyanate, aliphatic polyisocyanates, hexamethylene diisocyanate, free isocyanate-containing prepolymers obtained by reaction of a polyisocyanate with a polyol, modified polyisocyanates, carbodiimide-modified isocyanate, 2,4-toluene diisocyanate and 2,6-toluene diisocyanate, terminal isocyanate prepolymer derivatives of toluene diisocyanate, polyphenyl polymethylene diisocyanates, diphenylmethane diisocyanate derivatives having a terminal isocyanate group, and mixtures thereof.

* * * * *